(12) United States Patent
Gubaidullin

(10) Patent No.: US 10,305,739 B1
(45) Date of Patent: May 28, 2019

(54) METHOD FOR UNDOING USER ACTIONS INVOLVING SERVER CONTROL PANEL CONFIGURATION

(71) Applicant: Parallels IP Holdings GmbH, Schaffhausen (CH)

(72) Inventor: Igor Gubaidullin, Novosibirsk (RU)

(73) Assignee: Plesk International GmbH, Schaffhausen (CH)

( * ) Notice: Subject to any disclaimer, the term of this patent is extended or adjusted under 35 U.S.C. 154(b) by 236 days.

(21) Appl. No.: 15/255,966

(22) Filed: Sep. 2, 2016

(51) Int. Cl.
*G06F 15/177* (2006.01)
*H04L 29/06* (2006.01)
*H04L 12/24* (2006.01)
*H04L 29/08* (2006.01)

(52) U.S. Cl.
CPC .......... *H04L 41/0863* (2013.01); *H04L 67/02* (2013.01); *H04L 67/42* (2013.01); *G06F 15/177* (2013.01)

(58) Field of Classification Search
USPC ........................................................ 709/221
See application file for complete search history.

(56) References Cited

U.S. PATENT DOCUMENTS

| | | | | |
|---|---|---|---|---|
| 8,909,800 B1* | 12/2014 | Grebenschikov | ... | G06F 9/45558 709/223 |
| 8,918,371 B1* | 12/2014 | Prikhodko | .......... | G06F 11/3476 706/12 |
| 9,883,008 B2* | 1/2018 | Ravichandran | ......... | H04L 67/42 |
| 2006/0048129 A1* | 3/2006 | Napier | ...................... | G06F 8/62 717/168 |
| 2012/0271748 A1* | 10/2012 | DiSalvo | ................. | G06Q 40/04 705/37 |
| 2013/0204746 A1* | 8/2013 | Lee | ......................... | G06Q 10/06 705/26.62 |
| 2014/0337491 A1* | 11/2014 | Barreto | ............. | G06F 17/30194 709/221 |
| 2016/0210268 A1* | 7/2016 | Sales | ................... | G06F 3/04845 |

* cited by examiner

*Primary Examiner* — Viet D Vu
*Assistant Examiner* — James A Edwards
(74) *Attorney, Agent, or Firm* — Bardmesser Law Group

(57) ABSTRACT

A method, system and computer product for undoing user or administrator server configuration actions on a multi-tenant server panel. When a user or an administrator makes a mistake doing an operation in a server UI all the actions that were performed after the mistake, will be executed with errors, incorrectly or will produce unexpected results. The system allows for undoing all the subsequent user actions after the mistake to the point where the mistake was made. Separate action logs for each individual user or administrator are kept. A user can select an action from a menu list to be undone by invoking a corresponding server API without affecting any actions by other server panel users.

10 Claims, 3 Drawing Sheets

METHOD FOR UNDOING USER ACTIONS INVOLVING SERVER CONTROL PANEL CONFIGURATION

BACKGROUND OF THE INVENTION

Field of the Invention

The invention relates to undoing or reversing server configuration actions, and, more particularly, to performing undo operations in PLESK™ server panel or similar.

Description of the Related Art

The need to undo or reverse some user action performed using a server panel becomes ever more critical on multi-tenant servers such as PLESK™ servers, given the growing complexity of their configurations. When a user performs multiple operations in PLESK User Interface such as, for example, creation of a domain with mailboxes and specific DNS settings, the user, particularly an unsophisticated user, can accidentally make mistakes during this process. In this case, all the actions performed after the mistake, will produce errors, incorrect or unexpected results. Conventional system roll backs cannot be used to correct the wrong user action in a multi-tenant server system, because the server roll back would affect other users. The only option would be to cancel the entire process and start over.

Accordingly, it is desired to have the same roll back capability for each individual user, so the user can roll back all the subsequent actions after the mistake to the point where mistake was made, correct mistake and repeat all necessary subsequent actions without the consequences of this mistake.

SUMMARY OF THE INVENTION

The invention relates to undoing or reversing actions, and, more particularly, to performing undo operations in PLESK™ server panel or similar, that substantially overcomes one or more disadvantages of the related art.

In an exemplary embodiment, a method, system and computer product for undoing user or administrator action on PLESK™ server panel are provided. When a user or an administrator performs some operations in PLESK™ User Interface (UI) (which includes many actions), he can make mistakes. For example, when creating domain with mailboxes and specific DNS settings, one can accidentally make mistakes during this process. In this case, all the actions that were performed after the mistake, would be executed with errors, incorrectly or will produce unexpected results. The exemplary embodiment allows for "rolling back" (i.e., reversing) all the subsequent user actions after the mistake to the point where the mistake was made.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a method and system for undoing user and/or administrator actions on a PLESK™ server panel (or similar) are provided. Other servers used for undoing the actions can be cPanel, DirectAdmin, ISPManager, etc.

When a user or an administrator performs some operations in PLESK™ UI (which includes many actions), he can make mistakes. For example, when creating domain with mailboxes and specific DNS settings, one can accidentally make mistakes during this process. In this case, all the actions that were performed after the mistake, would be executed with errors, incorrectly or will produce unexpected results. Other user mistakes can be specific webserver settings, incorrect redirections, wrong PHP settings that can lead to incorrect site operation, errors in firewall settings that can affect common server security, defining incorrect migration parameters that can lead to re-migration at least, etc.

The exemplary embodiment allows for "rolling back" all the subsequent user actions after the mistake to the point where the mistake was made. Then, the mistake is corrected and all necessary subsequent user actions are repeated without consequences of this mistake and without affecting other users of the server panel.

In one embodiment, a user can completely undo all or a subset of the performed operations—i.e., roll them back to the original state or to some intermediate state. According to the exemplary embodiment, a journal with sequential detailed logs of all performed actions is created for each user. When a user clicks on the "Undo" button, he can see a drop-down sequential menu list of all performed actions with "Undo all" at the top of this list. If the user selects "Undo all," he completely reverses all of the performed operations, going back to some pre-set point. The user can also click on the action where mistake was made. Then, all the actions performed after the selected action are rolled back (i.e., reversed), according to the sequential records in the action log journal. According to the exemplary embodiment, a new specific format can be created for easy parsing process. The format depends on a particular method of parsing.

Figure 1:
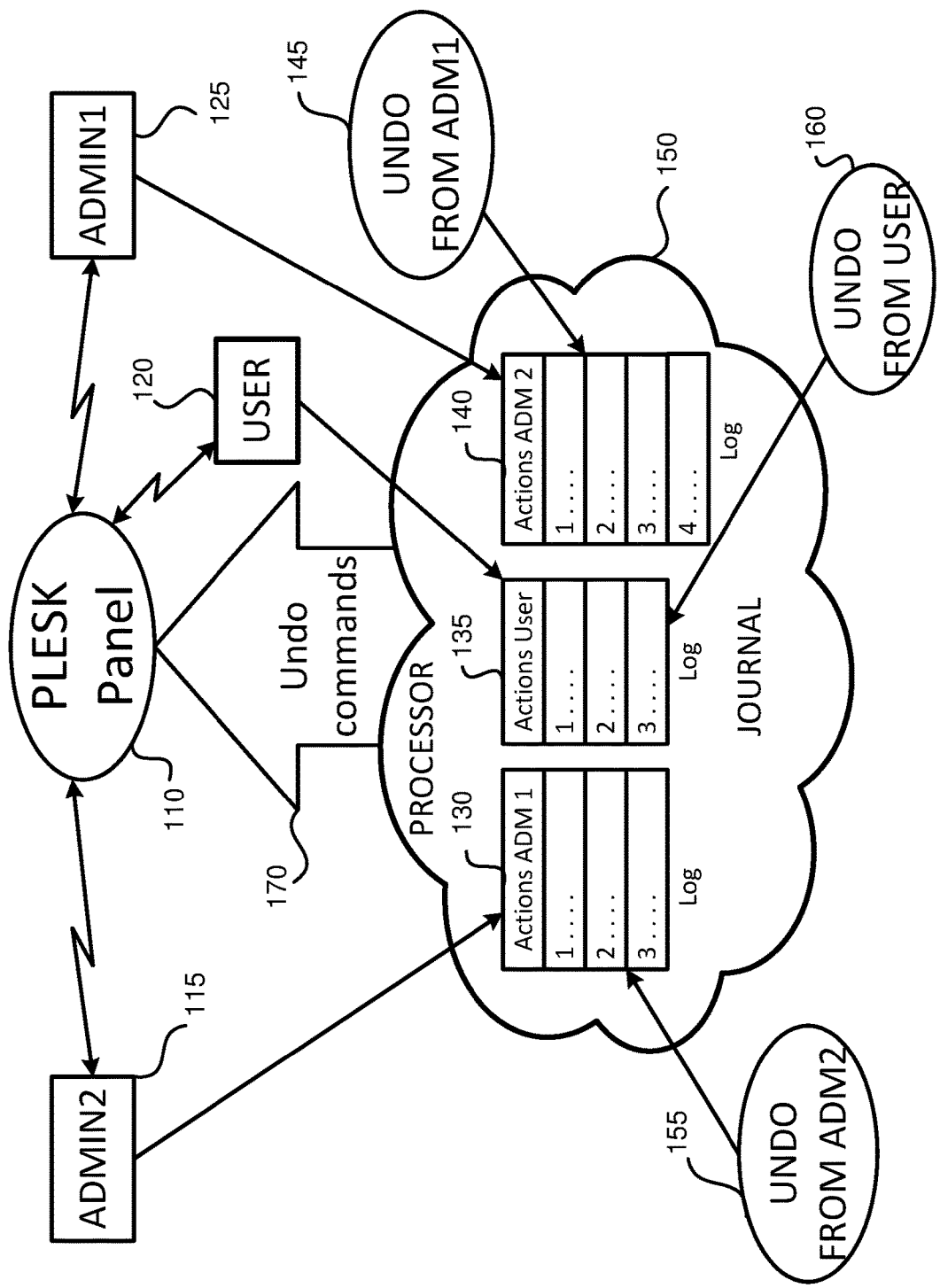
FIG. 1 illustrates an architecture of a system used for undoing user/administrator actions, in accordance with the exemplary embodiment.

FIG. 1 illustrates architecture of a system used for undoing user/administrator actions, in accordance with the exemplary embodiment. A PLESK server panel 110 can be accessed by administrators 115 and 125 or by a user 120. All actions can be performed by the administrators 115 and 125 and by the user 120. In this example, the actions of the administrator 115 are stored in a log 130 and the actions of the administrator 125 are stored in a log 140. The actions of the user 120 are stored in a log 135. The action logs 130, 135 and 140 reside on storage, such as RAM, of the processor 150. Then, any of the actions from the logs 130, 135 and 140 can be selected by a corresponding user/administrator (115, 125 and 120) from a menu list and the selected actions (i.e., commands) are undone by corresponding operations 145, 155 and 160. The undo commands 170 are implemented as PLESK APIs corresponding to each of the actions being reversed. In one embodiment, a user or an administrator can use an "undo all" option to undo all of his actions after a certain point. According to the exemplary embodiment, a user or an administrator issues an Undo command. The processor 150 generates a procedure in a form of an API XML request, which is transmitted by API protocol to the PLESK server 110 where it is executed by PLESK internal commands. Note that other vendors, such as cPanel, DirectAdmin, ISPmanager have their own XML APIs. There are many different types of APIs—XML, JSON, etc. that can be used, as well as REST (representational state transfer).

Note that the exemplary system for undoing the user/administrator provides for a multi-tenant environment where multiple users work with the same server panel simultaneously and can undo their actions simultaneously or in parallel, independent from each other, using their individual action logs. Furthermore, this undo process is more efficient that a conventional roll back to a certain point, which does not actually undo any of the operations.

One of the advantages of the exemplary embodiment is in multi-threading and multi-user features. Each user has its own log of actions and a rollback system implemented with a help of Undo operations. As discussed above, a conventional system snapshot does not take into account actions already implemented by individual users. In the proposed system, each user has the flexibility to control and undo their actions. Note that some of the server administrator actions have the highest priority and can override actions of regular PLESK users. Additionally, a reseller can be added as a third part of a common users hierarchy in PLESK context.

According to the exemplary embodiment, the undo component is implemented as a part of PLESK server. Alternatively, the undo component can be implemented on a separate server or a cloud server (as shown in FIG. 1). However, such an implementation may be slower than if this component resides on the local server. The action logs 130, 135 and 140 can reside in a local database or on a cloud. The PLESK processor 150 parses the action logs 130, 135 and 140 in order to form the request for undo API calls 170. According to an exemplary embodiment, a PLESK API XML can be used for parsing the action logs.

Figure 2:
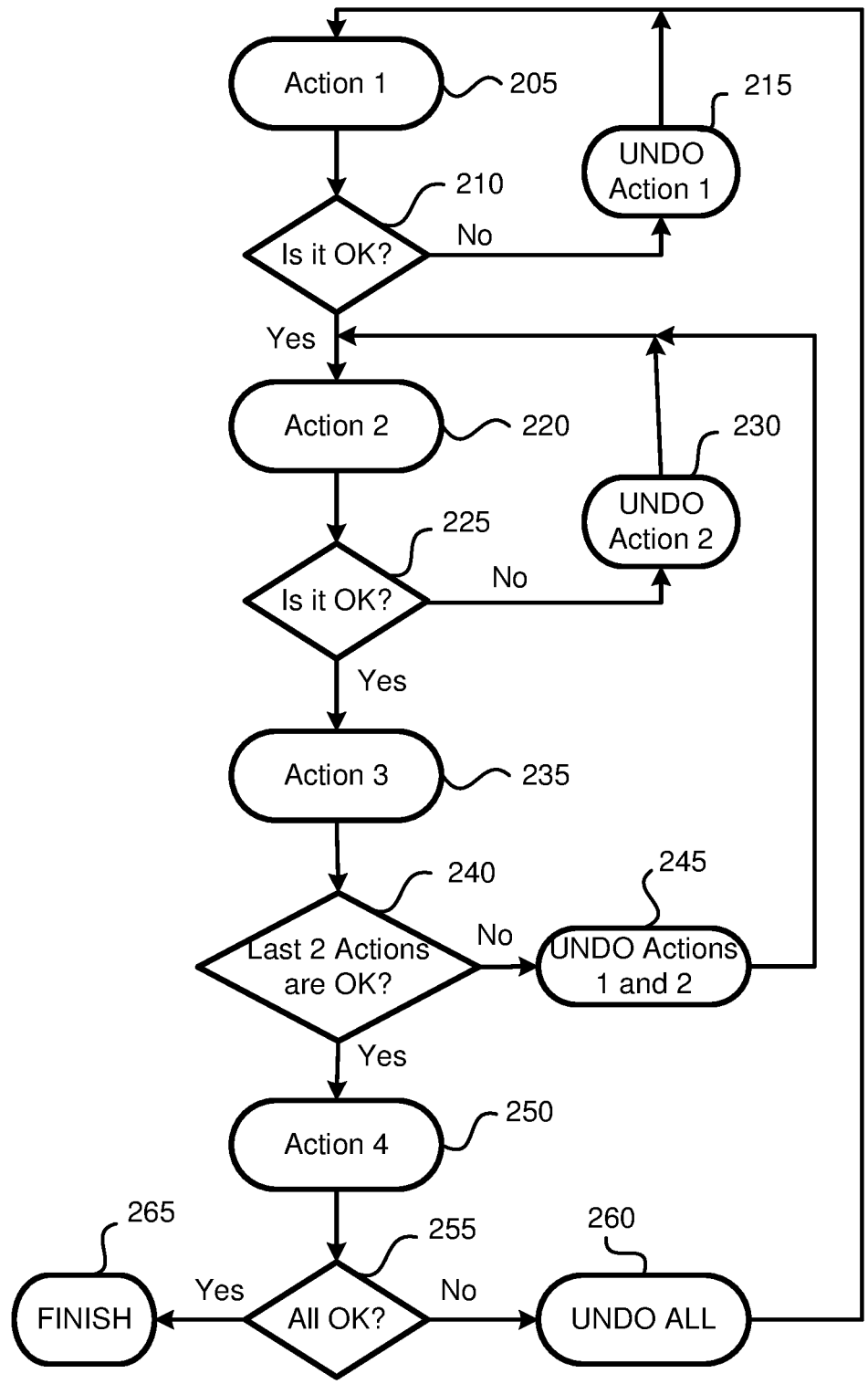
FIG. 2 illustrates a flowchart for a method of undoing user/administrator actions, in accordance with the exemplary embodiment.

FIG. 2 illustrates a flowchart for a method of undoing user/administrator actions, in accordance with the exemplary embodiment. In step 205 an action 1 is performed. If this action is not OK (i.e., made in error by the user) in step 210, the undo operation is performed in step 215. Otherwise, an action 2 is executed in step 220. If this action is made in error in step 225, the undo operation is performed for this action in step 230. In step 235 an action 3 is performed. If this action is made in error in step 240, the undo operation is performed for the action 3 and the previous actions 1 and 2. Otherwise, in step 250, the action 4 is performed. If the action 4 is made in error in step 255, the "undo all" operation is performed in step 260. This operation rolls back all of the action from 1 to 4. Otherwise the process is finished in step 265.

Figure 3:
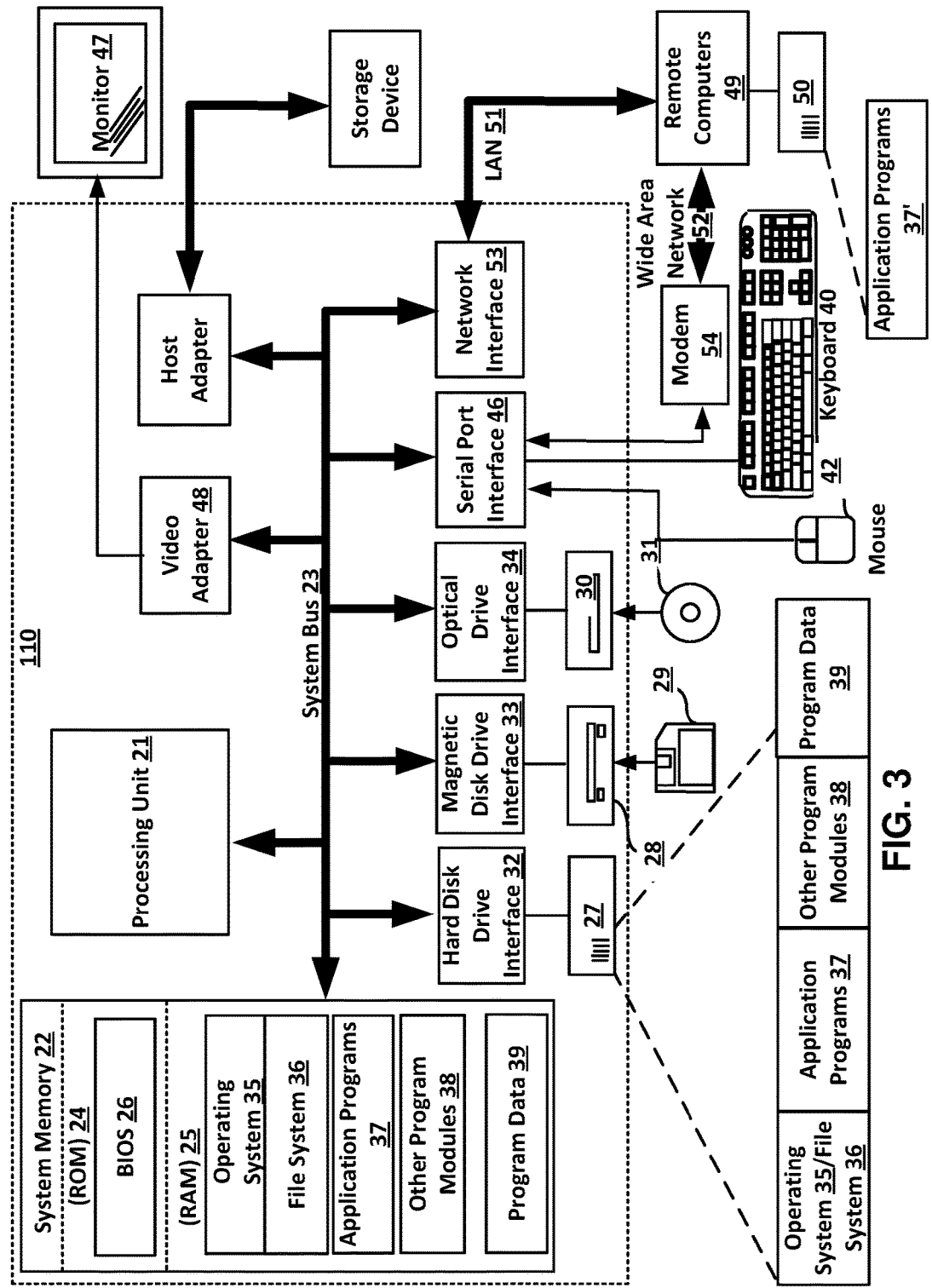
FIG. 3 illustrates a computer system or a host server, which can be used in the exemplary embodiment.

With reference to FIG. 3, an exemplary system for implementing the invention includes a general purpose computing device in the form of a computer or server 110 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 110, such as during start-up, is stored in ROM 24.

The server 110 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 110. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT Windows™ 2000). The server 110 includes a file system 36 associated with or included within the operating system 35, such as the Windows NT™ File System (NTFS), one or more application programs 37, other program modules 38 and program data 39. A user may enter commands and information into the server 110 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The server 110 may operate in a networked environment using logical connections to one or more remote computers 49. The remote computer (or computers) 49 may be another personal computer, a server, a router, a network PC, a peer device or other common network node, and it typically includes some or all of the elements described above relative to the server 110, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the server 110 is connected to the local network 51 through a network interface or adapter 53. When used in a WAN networking environment, the server 110 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the server 110, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A system for undoing user actions on a multi-tenant server hosting panel, the system comprising:
    a multi-tenant server hosting panel for configuring server hosting objects by multiple users and accessible by the multiple users who do not have system admin rights;
    a user action undo component implemented under the multi-tenant server hosting panel and configured to roll back user actions; and
    a sequential user action log accessible by the undo component and configured to store individual user actions performed by users through the multi-tenant server hosting panel, wherein the user actions relate to domain DNS settings and firewall settings,
    wherein the undo component parses the user action log to display a drop-down menu list of user actions so that a user can select a user action for the roll back, and invokes a server Application Programming Interface corresponding to the selected user action and rolls back the selected user action.

2. The system of claim 1, wherein the server hosting panel is PLESK™.

3. The system of claim 1, wherein the user action undo component is configured to roll back all user actions prior to the selected user action.

4. The system of claim 1, wherein the user action undo component is configured to roll back all user actions between the latest user action and an earlier selected user action.

5. The system of claim 1, wherein the user action undo component simultaneously reverses multiple selected user actions from different users and different server hosting panel administrators using multiple individual action logs.

6. The system of claim 1, wherein the user action undo component is implemented on a separate cloud server.

7. The system of claim 1, wherein the sequential user actions log is implemented using a remote database.

8. The system of claim 1, wherein the sequential user action log is implemented on cloud storage.

9. A method for undoing user actions on a multi-tenant server hosting panel, the method comprising:
    launching a multi-tenant server hosting panel for configuring server hosting objects;
    providing access to the multi-tenant server hosting panel to multiple users who do not have system admin rights;
    receiving and performing user actions;
    recording the user actions into a sequential user action log, wherein the user actions relate to domain DNS settings and firewall settings;
    selecting a user action containing errors using the multi-tenant server hosting panel;
    displaying a drop-down menu list of user actions so that a user can select a user action for the roll back after parsing the user action log for the selected user action;
    deleting the selected user action from the action log;
    invoking a server Application Programming Interface (API) corresponding to the selected user action; and
    rolling back the selected user action on the multi-tenant server hosting panel by executing the API.

10. The method of claim 9, further comprising invoking corresponding APIs for all user actions prior to the selected user action and rolling back the prior user actions by executing the APIs.

* * * * *